United States Patent
Zeng et al.

(10) Patent No.: US 11,445,497 B2
(45) Date of Patent: Sep. 13, 2022

(54) TRANSMISSION PARAMETER CONFIGURATION METHOD AND APPARATUS

(71) Applicant: Huawei Technologies Co., Ltd., Shenzhen (CN)

(72) Inventors: Yongbo Zeng, Beijing (CN); Yu Cai, Beijing (CN); Jian Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 26 days.

(21) Appl. No.: 17/050,558

(22) PCT Filed: Apr. 28, 2019

(86) PCT No.: PCT/CN2019/084780
§ 371 (c)(1),
(2) Date: Oct. 26, 2020

(87) PCT Pub. No.: WO2019/206328
PCT Pub. Date: Oct. 31, 2019

(65) Prior Publication Data
US 2021/0127376 A1     Apr. 29, 2021

(30) Foreign Application Priority Data
Apr. 28, 2018 (CN) .......................... 201810405100.0

(51) Int. Cl.
*H04W 72/04* (2009.01)
*H04W 4/40* (2018.01)
(Continued)

(52) U.S. Cl.
CPC ......... *H04W 72/044* (2013.01); *H04L 5/0048* (2013.01); *H04W 4/06* (2013.01);
(Continued)

(58) Field of Classification Search
CPC ............... H04W 72/04; H04W 72/044; H04W 72/0453; H04W 72/00; H04W 72/005;
(Continued)

(56) References Cited

U.S. PATENT DOCUMENTS

2012/0275414 A1* 11/2012 Hu ....................... H04B 7/0452
370/329
2015/0195827 A1* 7/2015 Feng ................... H04L 63/0428
380/270
(Continued)

FOREIGN PATENT DOCUMENTS

| CN | 105684508 A | 6/2016 |
| CN | 107318086 A | 11/2017 |

(Continued)

OTHER PUBLICATIONS

R1-156977, Alcatel-Lucent., et al., "Enhancements of DMRS and Demodulation for V2V," 3GPP TSG RAN WG1 Meeting #83, Anaheim, USA, Nov. 15-22, 2015, 11 pages.

*Primary Examiner* — Warner Wong
(74) *Attorney, Agent, or Firm* — Conley Rose, P.C.

(57) ABSTRACT

A transmission parameter configuration method includes a first device that determines a transmission parameter used for group communication, and sends information including the transmission parameter to a second device in a group through a broadcast message, where the first device is a management device of the group, and the transmission parameter includes a frequency domain resource or a demodulation reference signal (DMRS) pattern that is used for group communication of the group.

18 Claims, 3 Drawing Sheets

(51) Int. Cl.
*H04L 5/00* (2006.01)
*H04W 4/06* (2009.01)
*H04W 72/00* (2009.01)
*H04W 72/08* (2009.01)

(52) U.S. Cl.
CPC .......... *H04W 4/40* (2018.02); *H04W 72/005* (2013.01); *H04W 72/0406* (2013.01); *H04W 72/085* (2013.01)

(58) Field of Classification Search
CPC .......... H04W 4/30; H04W 4/40; H04W 4/44; H04W 4/46; H04W 4/06; H04W 4/08; H04W 72/0406; H04W 72/08; H04W 72/085; H04W 4/00; H04W 28/0273; H04W 80/00; H04W 2025/03592; H04L 5/0048; H04L 5/005; H04L 5/0051; H04L 47/38; H04L 1/0075; H04L 1/0681; H04L 65/1069
See application file for complete search history.

(56) References Cited

U.S. PATENT DOCUMENTS

| | | | |
|---|---|---|---|
| 2016/0014589 A1* | 1/2016 | Niu | H04W 8/005 370/329 |
| 2016/0212596 A1* | 7/2016 | Brahmi | H04W 72/042 |
| 2016/0219636 A1* | 7/2016 | Fujishiro | H04W 72/0453 |
| 2016/0360475 A1* | 12/2016 | Lindoff | H04W 4/80 |
| 2017/0094657 A1* | 3/2017 | Yoon | H04W 72/0446 |
| 2017/0188391 A1* | 6/2017 | Rajagopal | H04W 28/0284 |
| 2017/0289752 A1* | 10/2017 | Onishi | H04W 40/22 |
| 2018/0146471 A1* | 5/2018 | Xu | H04L 67/12 |
| 2018/0167184 A1 | 6/2018 | Zhou et al. | |
| 2018/0176750 A1* | 6/2018 | Xu | H04W 4/38 |
| 2018/0249518 A1* | 8/2018 | Nguyen | H04W 4/10 |
| 2018/0279096 A1* | 9/2018 | Wu | H04W 72/044 |
| 2019/0069282 A1 | 2/2019 | Luo et al. | |
| 2019/0223046 A1 | 7/2019 | Lee et al. | |
| 2020/0052842 A1* | 2/2020 | Rico Alvarino | H04L 5/005 |
| 2020/0274670 A1* | 8/2020 | Sun | H04W 72/0406 |
| 2020/0329465 A1* | 10/2020 | Zhang | H04L 27/2613 |
| 2021/0135922 A1* | 5/2021 | Gao | H04L 27/26136 |
| 2021/0266868 A1* | 8/2021 | Shin | H04L 1/0061 |

FOREIGN PATENT DOCUMENTS

| | | |
|---|---|---|
| CN | 107734590 A | 2/2018 |
| WO | 2017031625 A1 | 3/2017 |
| WO | 2017052307 A1 | 3/2017 |
| WO | 2018038565 A1 | 3/2018 |

* cited by examiner

TRANSMISSION PARAMETER CONFIGURATION METHOD AND APPARATUS

CROSS-REFERENCE TO RELATED APPLICATIONS

This application is a U.S. National Stage of International Patent Application No. PCT/CN2019/084780 filed on Apr. 28, 2019, which claims priority to Chinese Patent Application No. 201810405100.0 filed on Apr. 28, 2018, both of which are hereby incorporated by reference in their entireties.

TECHNICAL FIELD

This application relates to the field of internet-of-vehicles technologies, and in particular, to a transmission parameter configuration method and apparatus.

BACKGROUND

The 3GPP has standardized a V2X technology based on an LTE (Long Term Evolution) system, and a basic driving safety function is supported in several communication manners such as V2V (Vehicle to Vehicle, vehicle-to-vehicle communication), V2I (Vehicle to Infrastructure, vehicle-to-infrastructure network communication; and may also be referred to as V2N, Vehicle to Network), and V2P (Vehicle to Pedestrian, vehicle-to-pedestrian communication). On a basis of a 5G NR technology, internet-of-vehicles technologies continue to evolve and develop, and support more functions, for example, platoon (Platoon) communication, information sharing, unmanned driving, and remote driving.

In vehicle platoon communication shown in FIG. 1, vehicles in a same direction or with a same destination may dynamically form a vehicle platoon. Vehicle-mounted wireless devices in the vehicles in the platoon may communicate with each other, and the vehicle platoon may be created through communication between the vehicle-mounted devices. To be distinguished from the vehicle platoon, a collection of the vehicle-mounted devices in the vehicle platoon is referred to as a group. A platoon manager (for example, a lead vehicle) is responsible for creating a vehicle platoon. A vehicle-mounted device in the platoon manager is referred to as a group head, and a vehicle-mounted device in another platoon member is referred to as a group member.

The group head needs to update, in real time, surrounding traffic condition data reported by a group member, and reports the data to a roadside unit (Road side unit, RSU). At the same time, the group head receives messages from the RSU in real time and shares the messages with group members. These messages include road conditions and traffic information at a farther location. In addition, the group members may further share information with each other in a V2V manner. Therefore, platoon communication may include the following several communication environments: (1) communication between a group head and a group member; (2) communication between group members; (3) communication between a group member and a vehicle-mounted device in another vehicle that is not in the platoon; and (4) communication between a group head and an RSU.

The foregoing several communication environments have different characteristics. For example, a relative moving speed between group members in a platoon is comparatively low, a relative speed between a group member in a platoon and an RSU is equal to a vehicle speed, or a relative moving speed between a group member in a platoon and a vehicle-mounted device in a vehicle in an opposite direction is higher. In addition, NR V2X may support inter-band carrier aggregation. Therefore, for different types of communication, different information may be transmitted on different carriers or frequency bands.

In an LTE-V technology, to support mobility at a maximum relative speed of up to 500 km/h, a quantity of demodulation reference signals (Demodulation reference signal, DMRS) in each subframe is increased from 2 to 4. When a relative moving speed between vehicle-mounted devices in vehicles is comparatively high, four DMRS symbols can satisfactorily resist an impact of a Doppler frequency shift. However, if a relative moving speed between vehicle-mounted devices in vehicles is comparatively low, four DMRS symbols cause a waste of resources. In the prior art, a fixed DMRS pattern is used and cannot adapt to a change in a communication environment.

SUMMARY

Embodiments of this application provide a transmission parameter configuration method and apparatus, so as to resolve an existing problem that a fixed transmission parameter in group communication cannot adapt to a communication environment.

Specific technical solutions provided in the embodiments of this application are as follows.

According to a first aspect, this application provides a transmission parameter configuration method, including: determining, by a first device, a transmission parameter used for group communication, where the first device is a management device of a group, and the transmission parameter includes a frequency domain resource and/or a demodulation reference signal pattern DMRS pattern that are/is used for group communication of the group; and sending, by the first device, information including the transmission parameter to a second device in the group through a broadcast message.

According to the foregoing solution, the management device of the group configures and sends the information that includes the transmission parameter used for group communication, thereby implementing flexible configuration of the transmission parameter used for group communication, and utilizing wireless resources more efficiently.

With reference to the first aspect, in a first embodiment of the first aspect, the transmission parameter includes the frequency domain resource that is used for group communication of the group, and the determining, by a first device, a transmission parameter used for group communication may be implemented in the following manner:

manner 1: monitoring, by the first device, time-frequency domain resources in a resource pool, and determining, based on a monitoring result, the frequency domain resource that is used for group communication in the time-frequency resources in the resource pool; or manner 2: determining, by the first device based on an obtained channel busy ratio CBR of at least one channel, the frequency domain resource that is used for group communication in the at least one channel.

In the foregoing design, the first device can ensure that the determined frequency domain resource used for group communication is not occupied, thereby improving communication efficiency and communication quality of group communication.

With reference to the first aspect or the first embodiment of the first aspect, in a second embodiment of the first aspect, the transmission parameter includes the DMRS pattern that is used for group communication of the group, and when determining the transmission parameter used for group communication, the first device determines the DMRS pattern based on at least any one of the following: (1) a block error rate BLER obtained by the first device; (2) a channel quality measurement result obtained by the first device; (3) signal quality obtained by the first device and an association relationship that is between the signal quality and the DMRS pattern and that is obtained by the first device; or (4) geographic information obtained by the first device.

In the foregoing design, the first device can determine the DMRS pattern based on an actual communication environment, to adapt to a change in the communication environment, thereby avoiding wireless resource redundancy and a waste of wireless resources.

With reference to the first aspect, the first embodiment of the first aspect, or the second embodiment of the first aspect, in a third embodiment of the first aspect, the method further includes:

determining, by the first device, a specified resource used for group communication of the group, or obtaining, by the first device from a network device, a specified resource used for group communication of the group; and sending, by the first device, the information to the second device in the group on the specified resource through a broadcast message.

With reference to the first aspect, the first embodiment of the first aspect, the second embodiment of the first aspect, or the third embodiment of the first aspect, in a fourth embodiment of the first aspect, the broadcast message is a master information block-sidelink MIB-SL message transmitted on a PSBCH, or the broadcast message is an SCI message transmitted on a PSCCH, or the broadcast message is a radio resource control RRC message transmitted on a PSSCH.

With reference to the fourth embodiment of the first aspect, in a fifth embodiment of the first aspect, when the broadcast message is a MIB-SL message transmitted on a physical sidelink broadcast channel PSBCH, the first device adds, to a Tx-parameter in the MIB-SL message, a field that is used to indicate a frequency domain resource and/or a DMRS pattern, and sends the information to the second device in the group on the specified resource through the MIB-SL message.

With reference to the fourth embodiment of the first aspect, in a sixth embodiment of the first aspect, when the broadcast message is a sidelink control information SCI message transmitted on a physical sidelink control channel PSCCH, and the SCI message includes a field that is used to indicate a frequency domain resource and/or a DMRS pattern, the first device sends the information to the second device in the group on the specified resource through the SCI message.

With reference to the fourth embodiment of the first aspect, in a seventh embodiment of the first aspect, when the broadcast message is an RRC message transmitted on a physical sidelink shared channel PSSCH, and the RRC message is carried in SCI-associated data, the first device sends the information to the second device in the group on the specified resource through the RRC message.

In the foregoing design, a plurality of formats of the broadcast message are provided. In this way, when sending the information to the second device, the first device may flexibly select different signaling for sending.

With reference to the first aspect or any one of the foregoing embodiments of the first aspect, in an eighth embodiment of the first aspect, the DMRS pattern includes information that is used to indicate a quantity of DMRS symbols in a time scheduling unit, a location of a time-frequency resource, and a subcarrier spacing.

According to a second aspect, this application provides a transmission parameter configuration apparatus, applied to a first device and including:

a processing unit, configured to determine a transmission parameter used for group communication, where the first device is a management device of a group, and the transmission parameter includes a frequency domain resource and/or a demodulation reference signal pattern DMRS pattern that are/is used for group communication of the group; and a sending unit, configured to send information to a second device in the group through a broadcast message, where the information includes the transmission parameter.

With reference to the second aspect, in a first embodiment of the second aspect, the transmission parameter includes the frequency domain resource that is used for group communication of the group, and the processing unit is specifically configured to: monitor time-frequency domain resources in a resource pool, and determine, based on a monitoring result, the frequency domain resource that is used for group communication in the time-frequency resources in the resource pool; or determine, based on an obtained channel busy ratio CBR of at least one channel, the frequency domain resource that is used for group communication among the at least one channel.

With reference to the second aspect or the first embodiment of the second aspect, in a second embodiment of the second aspect, the transmission parameter includes the DMRS pattern that is used for group communication of the group, and the processing unit is specifically configured to determine the DMRS pattern based on at least any one of the following: an obtained block error rate BLER, an obtained channel quality measurement result, obtained signal quality and an obtained association relationship between the signal quality and the DMRS pattern, or obtained geographic information.

With reference to the second aspect, the first embodiment of the second aspect, or the second embodiment of the second aspect, in a third embodiment of the second aspect, the processing unit is further configured to: determine a specified resource used for group communication of the group, or obtain, by the first device from a network device, a specified resource used for group communication of the group; and the sending unit is specifically configured to send the information to the second device in the group on the specified resource through a broadcast message.

With reference to the second aspect, the first embodiment of the second aspect, the second embodiment of the second aspect, or the third embodiment of the second aspect, in a fourth embodiment of the second aspect, the broadcast message is a master information block-sidelink MIB-SL message transmitted on a PSBCH, or the broadcast message is an SCI message transmitted on a PSCCH, or the broadcast message is a radio resource control RRC message transmitted on a PSSCH.

With reference to the fourth embodiment of the second aspect, in a fifth embodiment of the second aspect, the sending unit is specifically configured to:

when the broadcast message is a MIB-SL message transmitted on a physical sidelink broadcast channel PSBCH, add, to a Tx-parameter in the MIB-SL message, a field that is used to indicate a frequency domain resource and/or a DMRS pattern, and send the information to the second device in the group on the specified resource through the MIB-SL message.

With reference to the fourth embodiment of the second aspect, in a sixth embodiment of the second aspect, the sending unit is specifically configured to:

when the broadcast message is a sidelink control information SCI message transmitted on a physical sidelink control channel PSCCH, and the SCI message includes a field that is used to indicate a frequency domain resource and/or a DMRS pattern, send the information to the second device in the group on the specified resource through the SCI message.

With reference to the fourth embodiment of the second aspect, in a seventh embodiment of the second aspect, the sending unit is specifically configured to:

when the broadcast message is an RRC message transmitted on a physical sidelink shared channel PSSCH, and the RRC message is carried in SCI-associated data, send the information to the second device in the group on the specified resource through the RRC message.

With reference to the second aspect or any one of the foregoing embodiments of the second aspect, in an eighth embodiment of the second aspect, the DMRS pattern includes information that is used to indicate a quantity of DMRS symbols in a time scheduling unit, a location of a time-frequency resource, and a subcarrier spacing.

According to a third aspect, this application provides a first device, including a communications interface, a processor, and a memory, where: the memory is configured to store a program; and the processor invokes the program stored in the memory and controls the communications interface, to perform the following steps: determining a transmission parameter used for group communication, where the first device is a management device of a group, and the transmission parameter includes a frequency domain resource and/or a demodulation reference signal pattern DMRS pattern that are/is used for group communication of the group; and sending information to a second device in the group through a broadcast message, where the information includes the transmission parameter.

With reference to the third aspect, in a first embodiment of the third aspect, the transmission parameter includes the frequency domain resource that is used for group communication of the group, and the processor is specifically configured to: monitor time-frequency domain resources in a resource pool, and determine, based on a monitoring result, the frequency domain resource that is used for group communication in the time-frequency resources in the resource pool; or determine, based on an obtained channel busy ratio CBR of at least one channel, the frequency domain resource that is used for group communication in the at least one channel.

With reference to the third aspect or the first embodiment of the third aspect, in a second embodiment of the third aspect, the transmission parameter includes the DMRS pattern that is used for group communication of the group, and the processor is specifically configured to determine the DMRS pattern based on at least any one of the following: an obtained block error rate BLER, an obtained channel quality measurement result, obtained signal quality and an obtained association relationship between the signal quality and the DMRS pattern, or obtained geographic information.

With reference to the third aspect, the first embodiment of the third aspect, or the second embodiment of the third aspect, in a third embodiment of the third aspect, the processor is further configured to: determine a specified resource used for group communication of the group, or obtain, by the first device from a network device, a specified resource used for group communication of the group; and the communications interface is specifically configured to send the information to the second device in the group on the specified resource through a broadcast message.

With reference to the third aspect, the first embodiment of the third aspect, the second embodiment of the third aspect, or the third embodiment of the third aspect, in a fourth embodiment of the third aspect, the broadcast message is a master information block-sidelink MIB-SL message transmitted on a PSBCH, or the broadcast message is an SCI message transmitted on a PSCCH, or the broadcast message is a radio resource control RRC message transmitted on a PSSCH.

With reference to the fourth embodiment of the third aspect, in a fifth embodiment of the third aspect, the communications interface is specifically configured to:

when the broadcast message is a MIB-SL message transmitted on a physical sidelink broadcast channel PSBCH, add, to a Tx-parameter in the MIB-SL message, a field that is used to indicate a frequency domain resource and/or a DMRS pattern, and send the information to the second device in the group on the specified resource through the MIB-SL message.

With reference to the fourth embodiment of the third aspect, in a sixth embodiment of the third aspect, the communications interface is specifically configured to:

when the broadcast message is a sidelink control information SCI message transmitted on a physical sidelink control channel PSCCH, and the SCI message includes a field that is used to indicate a frequency domain resource and/or a DMRS pattern, send the information to the second device in the group on the specified resource through the SCI message.

With reference to the fourth embodiment of the third aspect, in a seventh embodiment of the third aspect, the communications interface is specifically configured to:

when the broadcast message is an RRC message transmitted on a physical sidelink shared channel PSSCH, and the RRC message is carried in SCI-associated data, send the information to the second device in the group on the specified resource through the RRC message.

With reference to the third aspect or any one of the foregoing embodiments of the third aspect, in an eighth embodiment of the third aspect, the DMRS pattern includes information that is used to indicate a quantity of DMRS symbols in a time scheduling unit, a location of a time-frequency resource, and a subcarrier spacing.

According to a fourth aspect, this application provides a storage medium, where the storage medium stores a computer program, and when being executed by a processor, the computer program implements the method according to any embodiment of the first aspect.

According to a fifth aspect, this application provides a chip system, including a processor and used to support a first device in implementing the method according to any embodiment of the first aspect.

DESCRIPTION OF EMBODIMENTS

The following clearly and completely describes the technical solutions in the embodiments of this application with reference to the accompanying drawings in the embodiments of this application.

In communication using an NR V2X technology, different types of communication have different characteristics. Current communication through an LTE-V technology uses a fixed transmission parameter. However, if the fixed transmission parameter is still used especially in such a scenario as communication between vehicle-mounted devices in a vehicle platoon, where a relative moving speed is quite low, wireless resource redundancy and a waste of wireless resources may be caused, and the fixed transmission parameter cannot adapt to a change in a communication environment.

Figure 1:
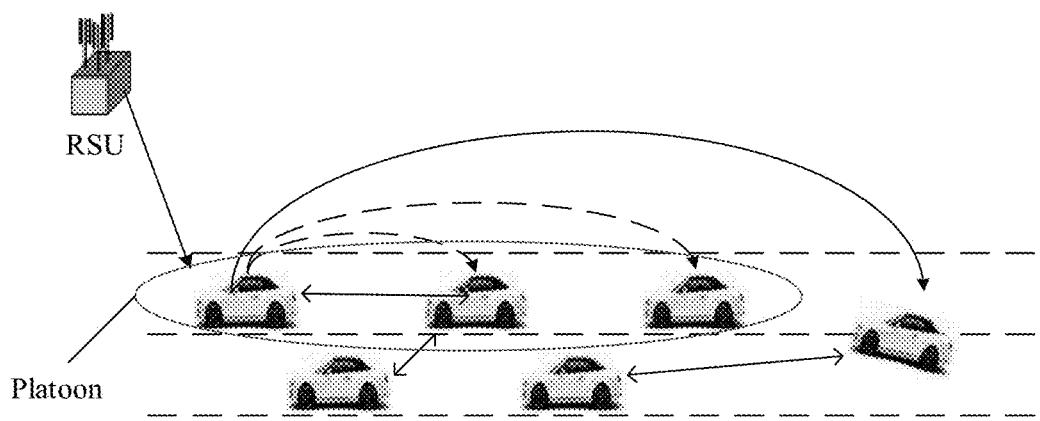
FIG. 1 is a schematic diagram of a vehicle platoon communication scenario.
Figure 2:
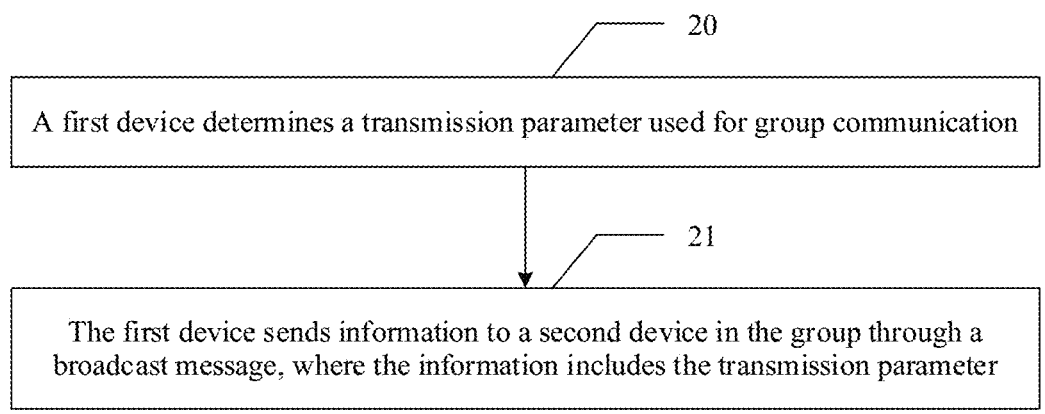
FIG. 2 is a flowchart of a transmission parameter configuration method according to an embodiment of this application.

For different communication forms possibly existing in vehicle platoon communication and a characteristic of relative mobility of a vehicle-mounted device in a vehicle platoon, this application proposes a transmission parameter configuration method, so that a transmission parameter used for communication in the platoon can flexibly adapt to different communication scenarios. For a specific process, refer to FIG. 2.

Step 20: A first device determines a transmission parameter used for group communication.

The first device is a management device of a group. Optionally, a management device of a group is a group head of the group. If the group is a collection of vehicle-mounted devices in a vehicle platoon, the first device may be a vehicle-mounted device in a lead vehicle in the vehicle platoon.

The transmission parameter includes a frequency domain resource and/or a demodulation reference signal (DMRS) pattern (pattern). The frequency domain resource is a collection of a group of frequency resources in frequency domain, including a carrier, a frequency band, a subcarrier set, a sub-band, a channel, a subchannel, and the like. The DMRS pattern includes information that is used to indicate a quantity of DMRS symbols in a time scheduling unit, a location of a time-frequency resource, and a subcarrier spacing. For example, the time scheduling unit may be a subframe length 1 ms defined in an LTE system, or may be a length that is an integer multiple of a basic scheduling time defined in an NR system, where the integer herein is an integer greater than or equal to 1.

Figure 3:
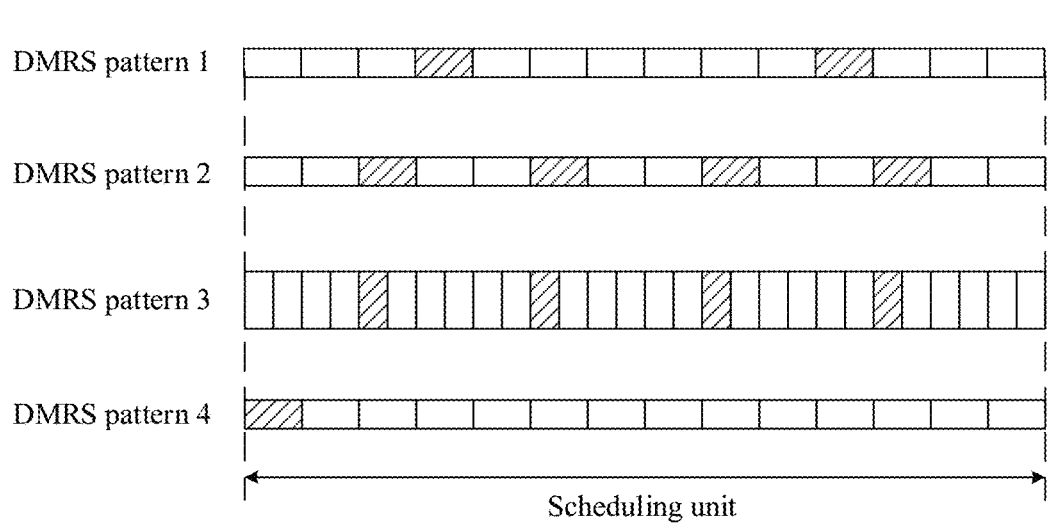
FIG. 3 is a schematic diagram of a DMRS pattern according to an embodiment of this application.

FIG. 3 is a schematic diagram of four DMRS patterns. A DMRS pattern 1 to a DMRS pattern 4 represent four different DMRS patterns. The four DMRS patterns have different quantities and locations of DMRS symbols within a time scheduling unit, or may have different subcarrier spacings in frequency domain. Specifically, a subcarrier spacing of a DMRS may be a subcarrier spacing defined in the NR system. For example, a subcarrier spacing of a DMRS pattern 3 is 30 kHz, and a subcarrier spacing of another DMRS pattern is 15 kHz.

Specifically, the first device may determine, in the following manners, the transmission parameter used for group communication:

Manner 1: The first device monitors time-frequency resources in a resource pool, and determines, based on a monitoring result, the frequency domain resource that is used for group communication in the time-frequency resources in the resource pool.

For example, the first device monitors frequency domain resources in the resource pool, and selects, based on the monitoring result, a comparatively idle frequency domain resource or a frequency domain resource with a comparatively low resource occupation ratio for group communication.

Manner 2: The first device determines, based on an obtained channel busy ratio (Channel Busy Ratio, CBR) of at least one channel, the frequency domain resource that is used for group communication.

Each vehicle-mounted device in an internet of vehicles measures a CBR of a channel (or a frequency band). When a CBR value of a channel (or a frequency band) is comparatively large, it indicates that the channel is comparatively congested. The first device may select, based on a measured CBR value of each of the at least one channel, a channel with a comparatively small CBR value as the frequency domain resource that is used for group communication.

Manner 3: The first device determines the DMRS pattern based on an obtained block error rate (Block Error Rate, BLER).

For example, if the first device obtains, through measurement, that a BLER of a data packet sent by another device is greater than a preset value, or if a BLER obtained by the first device by counting acknowledgements/negative acknowledgements (Acknowledge/Negative Acknowledge, ACK/NACK) fed back by another device is greater than a preset value, or if a BLER value reported by another device to the first device is greater than a preset value, the first device considers a DMRS pattern with a larger quantity of DMRS symbols, to improve robustness in signal demodulation.

Manner 4: The first device determines the DMRS pattern based on an obtained channel quality measurement result.

For example, an urban road and a highway have different channel quality environments, which consequently affect channel quality measurement results. In an urban environment, a radio signal is easily blocked, reflected, or absorbed by a building or a vehicle, a multipath environment is complex, and there may be no line-of-sight path. Therefore, the first device obtains poor channel quality by performing measurement based on a reference signal sent by another device. Nevertheless, on a highway, due to a comparatively large distance between vehicles, a single road, and few buildings, a line-of-sight path is easily available for a radio signal. Therefore, the first device usually obtains better channel quality by performing measurement based on a reference signal sent by another device. In addition, in a vehicle platoon, a vehicle-mounted device in a vehicle in the platoon may measure channel quality based on a reference signal sent by a vehicle-mounted device in a lead vehicle, to obtain a channel quality measurement result, and feed back the channel quality measurement result to the vehicle-mounted device in the lead vehicle. The vehicle-mounted device in the lead vehicle adjusts a DMRS pattern based on the channel quality measurement result. For example, the channel quality measurement result may be represented by a channel quality indicator (Channel Quality Indication, CQI). When the CQI is less than a preset value, the vehicle-mounted device in the lead vehicle selects a frequency domain resource with a comparatively low frequency, and increases a quantity of DMRS symbols.

Manner 5: The first device determines the DMRS pattern based on obtained signal quality and an obtained association relationship between the signal quality and the DMRS pattern.

For example, signal quality representing wanted-signal strength and interfering-signal strength varies with time and place, and can reflect a signal propagation environment to some extent. When a vehicle is moving, a vehicle-mounted device may collect statistics on signal quality and a corresponding DMRS pattern, and then associate different signal quality with an appropriate DMRS pattern. Different DMRS patterns may be used in different signal quality intervals. For example, good signal quality may be associated with a DMRS pattern with a small quantity of DMRS symbols. Reference signal received quality (Reference Signal Receiving Quality, RSRQ), a signal to interference plus noise ratio (Signal to interference plus noise ratio, SINR), and the like are all parameters reflecting signal quality. This is not limited in the present invention.

Manner 6: The terminal determines the DMRS pattern based on an obtained geographic location.

If a physical layer of the terminal can obtain cross-layer information from an application layer, the application layer may send, to the physical layer based on location information, an instruction for adjusting a transmission parameter. In this way, different transmission parameter configurations may be used at different geographic locations such as a tunnel and an open area. For example, when the first device moves near a tunnel, a DMRS pattern with a comparatively large quantity of reference symbols is selected, to resist interference; whereas when the first device is in an open area, a DMRS pattern with a comparatively small quantity of reference symbols is selected, to reduce a waste of resources.

Step 21: The first device sends information to a second device in the group through a broadcast message, where the information includes the transmission parameter.

Specifically, in step 21, the first device sends the information to the second device in the group on a specified resource through a broadcast message.

The specified resource includes a specified channel, a specified subchannel, a specified time-frequency domain resource, a specified frequency band, a specified sub-band, and the like. The specified channel may be a common channel or another specified channel.

In a possible design, the specified resource may be pre-configured locally on the first device. In this case, the first device determines, based on configuration information, the specified resource used for group communication of the group.

In another possible design, the specified resource may be alternatively configured by a network device such as a roadside unit or a base station. In this case, the first device obtains the specified resource used for group communication of the group from the network device.

The second device is a device other than the group head in the group. When a group includes vehicle-mounted devices in a vehicle platoon, the second device is a vehicle-mounted device of a member in the vehicle platoon.

The broadcast message is a master information block-sidelink (Master Information Block-Sidelink, MIB-SL) message transmitted on a physical sidelink broadcast channel (Physical Sidelink Broadcast Channel, PSBCH), or the broadcast message is a sidelink control information (Sidelink Control Information, SCI) message transmitted on a physical sidelink control channel (Physical Sidelink Control Channel, PSCCH), or the broadcast message is a radio resource control (Radio Resource Control, RRC) message transmitted on a physical sidelink shared channel (Physical Sidelink Shared Channel, PSSCH).

In a possible design, when the broadcast message is a MIB-SL message transmitted on a PSBCH, the first device adds, to a Tx-parameter in the MIB-SL message, a field that is used to indicate a frequency domain resource and/or a DMRS pattern, and sends the information to the second device in the group on the specified resource through the MIB-SL message. Optionally, the first device may alternatively add, to another field or domain in the MIB-SL message, a field that is used to indicate a frequency domain resource and/or a DMRS pattern, or may alternatively add, to the MIB-SL message, a field that is used to indicate a frequency domain resource and/or a DMRS pattern.

In a possible design, when the broadcast message is an SCI message transmitted on a PSCCH, and the SCI message includes a field that is used to indicate a frequency domain resource and/or a DMRS pattern, the first device sends the information to the second device in the group on the specified resource through the SCI message.

In a possible design, when the broadcast message is an RRC message transmitted on a PSSCH, and the RRC message is carried in SCI-associated data, the first device sends the information to the second device in the group on the specified resource through the RRC message.

Further, after obtaining the transmission parameter in the broadcast message on the specified resource, the second device jumps to the frequency domain resource corresponding to the transmission parameter to perform group communication.

Figure 5:
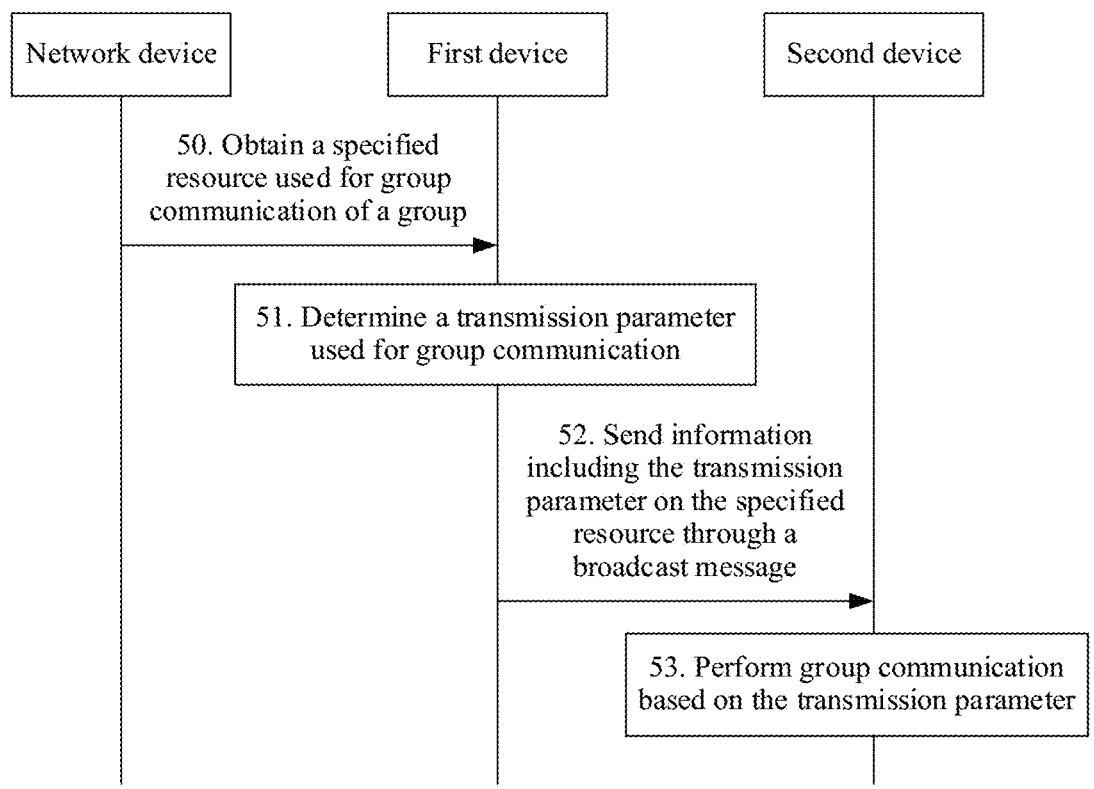
FIG. 5 is a flowchart of a transmission parameter configuration method according to an embodiment of this application.

For example, FIG. 5 is a possible interaction flowchart of a transmission parameter configuration method. The method specifically includes the following process.

Step 50: A first device obtains, from a network device, a specified resource used for group communication of a group.

Step 51: The first device determines a transmission parameter used for group communication.

Step 52: The first device sends information including the transmission parameter to a second device in the group on the specified resource through a broadcast message.

Step 53: After obtaining the transmission parameter in the broadcast message on the specified resource, the second device performs group communication based on the transmission parameter.

The following describes the foregoing transmission parameter configuration method in detail by using a specific embodiment. In this embodiment of this application, a vehicle platoon is considered as a group, and a vehicle-mounted device in a lead vehicle in the vehicle platoon is used as a management device of the group, that is, a first device, for further description.

S1: The vehicle-mounted device in the lead vehicle determines a transmission parameter used for communication of the vehicle platoon, where the transmission parameter includes at least a carrier or a frequency band, or a DMRS pattern.

It should be noted that in an actual application process, different groups including vehicle-mounted devices in vehicle platoons may select different transmission parameters, that is, the transmission parameters are in a one-to-one correspondence with the groups including vehicle-mounted devices in vehicle platoons.

Specifically, when determining a carrier or a frequency band in the transmission parameter, the vehicle-mounted device in the lead vehicle may monitor a plurality of carriers according to a resource selection procedure in R14, to determine a carrier or a frequency band.

Specifically, when determining a DMRS pattern in the transmission parameter, the vehicle-mounted device in the lead vehicle may determine the DMRS pattern based on an obtained BLER, an obtained channel quality measurement result, or obtained geographic information.

For example, when a BLER obtained by the vehicle-mounted device in the lead vehicle is slightly large and greater than a preset value, the vehicle-mounted device in the lead vehicle considers increasing a quantity of DMRS symbols, to improve robustness in signal demodulation.

For another example, channel quality measurement results are affected because an urban road and a highway have different channel environments. A vehicle-mounted device in a vehicle in the platoon may feed back a CQI to the vehicle-mounted device in the lead vehicle, and the vehicle-mounted device in the lead vehicle adjusts the DMRS pattern based on CQI statistics.

In this way, the vehicle-mounted device in the lead vehicle may use, based on channel quality, an appropriate transmission parameter used for platoon communication, to obtain better performance. For example, when channel quality is comparatively poor, a more robust DMRS pattern may be used; whereas when channel quality is comparatively good, a DMRS pattern occupying fewer resources may be used.

For another example, if a physical layer of the vehicle-mounted device in the lead vehicle can obtain cross-layer information from an application layer, the application layer may send, to the physical layer based on location information, an instruction for adjusting a transmission parameter. In this way, different transmission parameter configurations may be used at different locations such as a tunnel and an open area.

S2: The vehicle-mounted device in the lead vehicle sends information including the transmission parameter on a common channel through a broadcast message.

Specifically, for a manner of sending the transmission parameter, refer to a description in the foregoing embodiment. Details are not described herein again.

Figure 4:
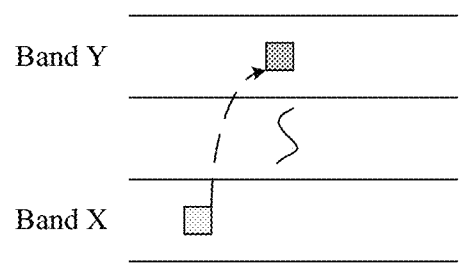
FIG. 4 is a schematic diagram of sending, by a vehicle-mounted device in a lead vehicle, a broadcast message including a frequency domain resource indication according to an embodiment of this application.

Specifically, indication formats of a DMRS pattern and a frequency domain resource may be represented by using specified bits. For example, three bits may be used to represent eight DMRS patterns. The frequency domain resource may be represented by a carrier or a frequency band. For representing of the frequency domain resource, available carriers or frequency bands may be numbered. For example, three bits may be used to represent eight frequency bands. FIG. 4 is a schematic diagram of sending, by a vehicle-mounted device in a lead vehicle on a common frequency band (which may also be referred to as a common channel), a broadcast message including a frequency domain resource indication. FIG. 4 describes that the vehicle-mounted device in the lead vehicle sends the broadcast message on a frequency band X, to configure a transmission parameter that is to be used on another frequency band Y and that is used for communication within a vehicle platoon. In FIG. 4, the band X represents a primary channel or primary frequency band configured by a system, and the band Y represents another frequency band or channel.

S3: After obtaining the transmission parameter on the common channel, a vehicle-mounted device in another vehicle in the platoon jumps to a corresponding resource to perform group communication in the platoon.

First, the vehicle-mounted device in the another vehicle in the platoon obtains, on the common channel, the transmission parameter in the information sent by the vehicle-mounted device in the lead vehicle. Then, the vehicle-mounted device in the another vehicle in the platoon jumps to a resource of a carrier indicated by the vehicle-mounted device in the lead vehicle, to perform in-platoon communication.

The common channel may be configured through a network device or may be pre-configured.

In an existing LTE-V technology, a DMRS pattern is a fixed configuration, and does not support cross-carrier scheduling. In the embodiments of this application, considering characteristics of vehicle platoon communication, the vehicle-mounted device in the lead vehicle configures and sends the transmission parameter used for platoon communication, and the broadcast message including the transmission parameter is sent on the specified resource, thereby implementing flexible configuration of the transmission parameter used for group communication, and utilizing wireless resources more efficiently.

Figure 6:
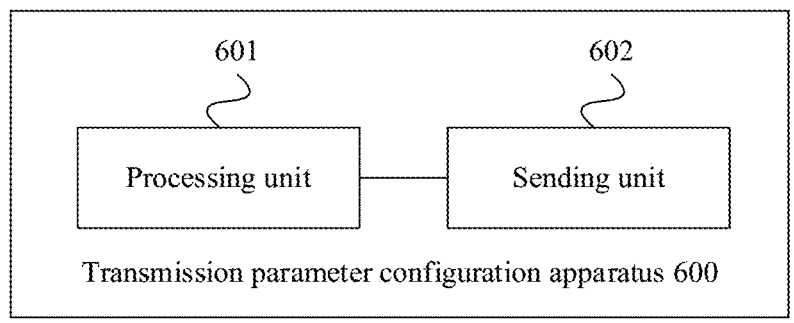
FIG. 6 is a structural diagram of a transmission parameter configuration apparatus according to an embodiment of this application.

Based on the foregoing embodiments, an embodiment of this application provides a transmission parameter configuration apparatus, corresponding to a first device. The first device is a management device of a group, and is used to implement the method shown in FIG. 2. Referring to FIG. 6, the transmission parameter configuration apparatus 600 includes:

a processing unit 601, configured to determine a transmission parameter used for group communication, where the transmission parameter includes a frequency domain resource and/or a demodulation reference signal pattern DMRS pattern that are/is used for group communication of the group; and a sending unit 602, configured to send information to a second device in the group through a broadcast message, where the information includes the transmission parameter.

Optionally, the transmission parameter includes the frequency domain resource that is used for group communication of the group, and the processing unit 601 is specifically configured to:

monitor time-frequency domain resources in a resource pool, and determine, based on a monitoring result, the frequency domain resource that is used for group communication in the time-frequency resources in the resource pool; or determine, based on an obtained channel busy ratio CBR of at least one channel, the frequency domain resource that is used for group communication in the at least one channel.

Optionally, the transmission parameter includes the DMRS pattern that is used for group communication of the group, and the processing unit 601 is specifically configured to determine the DMRS pattern based on at least any one of the following:

an obtained block error rate BLER;

an obtained channel quality measurement result;

obtained signal quality and an obtained association relationship between the signal quality and the DMRS pattern; or obtained geographic information.

Optionally, the processing unit 601 is further configured to:

determine a specified resource used for group communication of the group, or obtain, by the first device from a network device, a specified resource used for group communication of the group; and and the sending unit 602 is specifically configured to send the information to the second device in the group on the specified resource through a broadcast message.

Optionally, the broadcast message is a master information block-sidelink MIB-SL message transmitted on a PSBCH, or the broadcast message is an SCI message transmitted on a PSCCH, or the broadcast message is a radio resource control RRC message transmitted on a PSSCH.

Optionally, the sending unit 602 is specifically configured to:

when the broadcast message is a MIB-SL message transmitted on a physical sidelink broadcast channel PSBCH, add, to a Tx-parameter in the MIB-SL message, a field that is used to indicate a frequency domain resource and/or a DMRS pattern, and send the information to the second device in the group on the specified resource through the MIB-SL message.

Optionally, the sending unit 602 is specifically configured to:

when the broadcast message is a sidelink control information SCI message transmitted on a physical sidelink control channel PSCCH, and the SCI message includes a field that is used to indicate a frequency domain resource and/or a DMRS pattern, send the information to the second device in the group on the specified resource through the SCI message.

Optionally, the sending unit 602 is specifically configured to:

when the broadcast message is an RRC message transmitted on a physical sidelink shared channel PSSCH, and the RRC message is carried in SCI-associated data, send the information to the second device in the group on the specified resource through the RRC message.

Optionally, the DMRS pattern includes information that is used to indicate a quantity of DMRS symbols in a time scheduling unit, a location of a time-frequency resource, and a subcarrier spacing.

The network device provided in this embodiment of this application may execute the foregoing corresponding method embodiment, and an implementation principle and technical effect are similar, which is not repeatedly described herein.

It should be understood that the foregoing division of the units in the transmission parameter configuration apparatus is merely logical function division, and in actual implementation, all or some of the units may be integrated into one physical entity, or may be physically separated. In addition, all these units may be implemented in a form of invoking software by a processing element; or all these units may be implemented in a form of hardware; or some of the units may be implemented in a form of invoking software by a processing element, and some of the units may be implemented in a form of hardware. For example, the sending unit may be a separately disposed processing element, or may be implemented by being integrated in a chip in the transmission parameter configuration apparatus. In addition, the sending unit may be stored as a program in a memory in the transmission parameter configuration apparatus, and a processing element of the transmission parameter configuration apparatus invokes the program and executes a function of the sending unit. Implementation of another unit is similar to implementation of the sending unit. In addition, all or some of these units may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the foregoing sending unit is a sending control unit, and may receive information by using a sending apparatus, for example, an antenna and a radio frequency apparatus, in the transmission parameter configuration apparatus.

The foregoing units may be one or more integrated circuits configured to implement the foregoing method, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when one of the foregoing units is implemented in a form of scheduling a program by a processing element, the processing element may be a general purpose processor, for example, a central processing unit (Central Processing Unit, CPU) or another processor that can invoke a program. For another example, these units may be integrated together and implemented in a form of a system-on-a-chip (system-on-a-chip, SOC).

Figure 7:
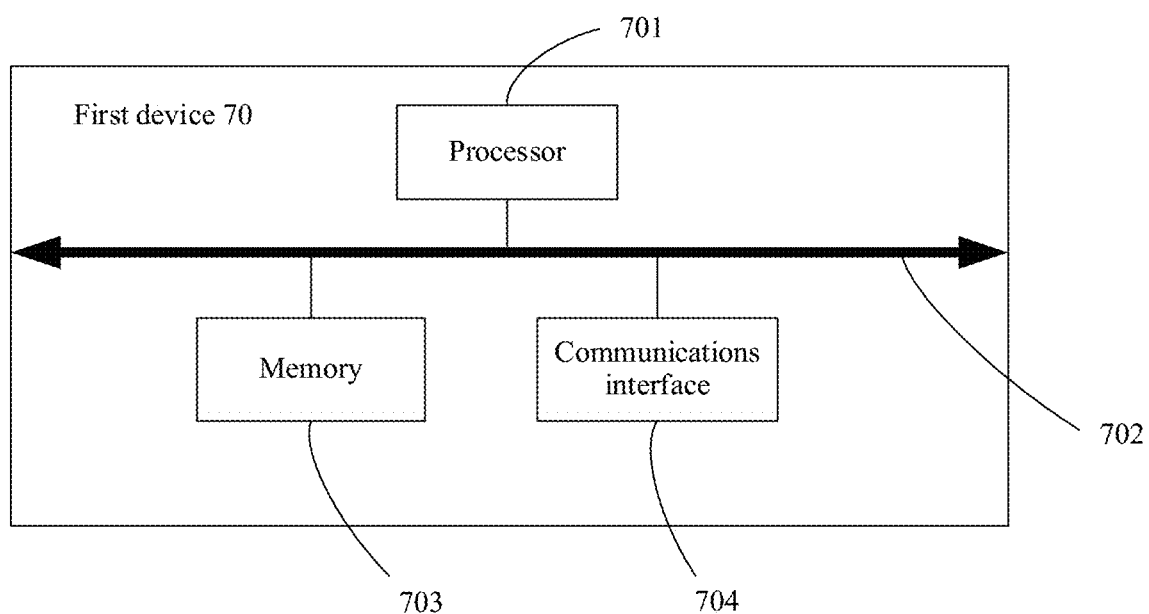
FIG. 7 is a structural diagram of a first device according to an embodiment of this application.

FIG. 7 is a schematic diagram of a hardware structure of a first device 70 according to an embodiment of this application. The first device 70 includes at least one processor 701, a communications bus 702, a memory 703, and at least one communications interface 704.

The processor 701 may be a general purpose central processing unit (central processing unit, CPU), a microprocessor, an application-specific integrated circuit (application-specific integrated circuit, ASIC), or one or more integrated circuits configured to control program execution of the solutions in this application.

The communications bus 702 may include a path for transferring information between the foregoing components.

The communications interface 704 uses an apparatus such as any transceiver, and is configured to communicate with another device or communications network, for example, an ethernet, a radio access network (radio access network, RAN), or a wireless local area network (wireless local area networks, WLAN).

The memory 703 may be a read-only memory (read-only memory, ROM) or another type of static storage device capable of storing static information and an instruction, a random access memory (random access memory, RAM) or another type of dynamic storage device capable of storing information and an instruction, or may be an electrically erasable programmable read-only memory (electrically erasable programmable read-only memory, EEPROM), a compact disc read-only memory (compact disc read-only memory, CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of an instruction or a data structure and capable of being accessed by a computer, but is not limited thereto. The memory may exist independently, and may be connected to the processor through the bus. The memory may be alternatively integrated with the processor.

The memory 703 is configured to store application program code that is used for executing the solutions in this application, and the execution is controlled by the processor 701. The processor 701 is configured to execute the application program code stored in the memory 703, to implement the transmission parameter configuration method provided in the foregoing embodiments of this application.

Alternatively, optionally, in this embodiment of this application, the processor 701 may perform a processing-related function in the transmission parameter configuration method provided in the foregoing embodiments of this application, and the communications interface 704 is responsible for communication with another device or communications network. This is not specifically limited in this embodiment of this application.

In specific implementation, in an embodiment, the processor 701 may include one or more CPUs.

In specific implementation, in an embodiment, the first device 70 may include a plurality of processors. Each of these processors may be a single-core (single-CPU) processor, or may be a multi-core (multi-CPU) processor. The processor herein may be one or more devices, circuits, and/or processing cores configured to process data (for example, a computer program instruction).

In addition, as described above, the first device 70 provided in this embodiment of this application may be a chip, a terminal, a network device, or a device with a structure similar to that in FIG. 7. A type of the communications device 70 is not limited in this embodiment of this application.

In this embodiment, the first device 70 is presented in a form of obtaining each functional module through division in an integrated manner. The "module" herein may be an application-specific integrated circuit (Application-Specific Integrated Circuit, ASIC), a circuit, a processor and a memory that execute one or more software or firmware programs, an integrated logic circuit, and/or another component that can provide the foregoing functions. In a simple embodiment, a person skilled in the art may figure out that the first device 70 may be in a form shown in FIG. 7. For example, functions/implementation processes of the processing unit 601 and the sending unit 602 in FIG. 6 may be implemented by using the processor 701 and the memory 703 in FIG. 7. Specifically, the processing unit 601 may be implemented by invoking, by the processor 701, the application program code stored in the memory 703. This is not limited in this embodiment of this application. Alternatively, optionally, a function/an implementation process of the processing unit 601 in FIG. 6 may be implemented by using the processor 401 in FIG. 4. The sending unit 602 in FIG. 6 may be implemented by using the communications interface 704 in FIG. 7. This is not limited in this embodiment of this application.

Optionally, an embodiment of this application provides a chip system. The chip system includes a processor and is used to support a first device in implementing the foregoing transmission parameter configuration method. In a possible design, the chip system further includes a memory. The memory is configured to store a program instruction and data that are necessary for the first device. The chip system may include a chip, or may include a chip and another discrete device. This is not specifically limited in this embodiment of this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A transmission parameter configuration method implemented by a first device, wherein the transmission parameter configuration method comprises:
   determining a transmission parameter for a first group communication, wherein the first device is a management device of a group, and wherein the transmission parameter comprises a demodulation reference signal (DMRS) pattern that is for a second group communication of the group;
   sending information comprising the transmission parameter to a second device in the group through a broadcast message, wherein the broadcast message is a master information block-sidelink (MIB-SL) message transmitted on a physical sidelink broadcast channel (PSBCH) or a sidelink control information (SCI) message transmitted on a physical sidelink control channel (PSCCH); and performing one of:
  add a field indicating the DMRS pattern to the transmission parameter in the MIB-SL message when the broadcast message is the MIB-SL message transmitted on the PSBCH; or
  send the information to the second device in the group on the resource through the SCI message when the broadcast message is the SCI message transmitted on the (PSCCH), wherein the SCI message comprises a field indicating the DMRS pattern.

2. The transmission parameter configuration method of claim 1, wherein the transmission parameter comprises a frequency domain, and wherein the transmission parameter configuration method further comprises either:
  monitoring time-frequency domain resources in a resource pool to obtain a monitoring result, and determining, based on the monitoring result, the frequency domain resource for a third group communication in the time-frequency resources in the resource pool; or
  determining, based on a channel busy ratio (CBR) of a channel, the frequency domain resource for a fourth group communication in the channel.

3. The transmission parameter configuration method of claim 1, wherein the transmission parameter comprises the DMRS pattern, and wherein the transmission parameter configuration method further comprises determining the DMRS pattern based on at least one of the following:
  a block error rate (BLER);
  a channel quality measurement result;
  a signal quality and an association relationship between the signal quality and the DMRS pattern; or
  geographic information.

4. The transmission parameter configuration method of claim 1 further comprising:
  determining a resource for the group communication or obtaining, from a network device, the resource; and
  sending the information to the second device in the group on the resource through the broadcast message.

5. The transmission parameter configuration method of claim 4, wherein the broadcast message is a Radio Resource Control (RRC) message transmitted on a physical sidelink shared channel (PSSCH).

6. The transmission parameter configuration method of claim 5 further comprising sending the information to the second device in the group on the resource through the RRC message when the broadcast message is the RRC message transmitted on the PSSCH, and wherein the RRC message is carried in SCI-associated data.

7. A first device comprising:
  a memory configured to store a program; and
  a processor coupled to the memory, wherein the program causes the processor to be configured to:
    determining a transmission parameter for a first group communication, wherein the first device is a management device of a group, and wherein the transmission parameter comprises a demodulation reference signal (DMRS) pattern that is for a second group communication of the group;
    sending information comprising the transmission parameter to a second device in the group through a broadcast message, wherein the broadcast message is a master information block-sidelink (MIB-SL) message transmitted on a physical sidelink broadcast channel (PSBCH) or a sidelink control information (SCI) message transmitted on a physical sidelink control channel (PSCCH); and
    performing one of:
      add a field indicating the DMRS pattern to the transmission parameter in the MIB-SL message when the broadcast message is a master information block-sidelink (MIB-SL) message transmitted on a physical sidelink broadcast channel (PSBCH); or
      send the information to the second device in the group on the resource through the SCI message when the broadcast message is a sidelink control information (SCI) message transmitted on a physical sidelink control channel (PSCCH), wherein the SCI message comprises a field indicating the DMRS pattern.

8. The first device of claim 7, wherein the transmission parameter comprises a frequency domain resource, and wherein the program further causes the processor to be configured to either:
  monitor time-frequency domain resources in a resource pool to obtain a monitoring result, and determining, based on the monitoring result, the frequency domain resource for the group communication in the time-frequency resources in the resource pool; or
  determine, based on a channel busy ratio (CBR) of a channel, the frequency domain resource for the group communication in the channel.

9. The first device of claim 7, wherein the transmission parameter comprises the DMRS pattern, and wherein the program further causes the processor to be configured to configure the DMRS pattern based on at least any one of the following:
  a block error rate (BLER);
  a channel quality measurement result;
  a signal quality and an association relationship that is between the signal quality and the DMRS pattern; or
  geographic information.

10. The first device of claim 7, wherein the program further causes the processor to be configured to:
  determine a resource for the group communication, or obtain, from a network device, the resource; and
  send the information to the second device in the group on the resource through the broadcast message.

11. The first device of claim 10, wherein the broadcast message is a Radio Resource Control (RRC) message transmitted on a physical sidelink shared channel (PSSCH).

12. The first device of claim 11, wherein the program further causes the processor to be configured to send the information to the second device in the group on the resource through the RRC message when the broadcast message is the RRC message transmitted on the PSSCH, and wherein the RRC message is carried in SCI-associated data.

13. The first device of claim 7, wherein the first device is a vehicle.

14. A computer program product comprising computer-executable instructions for storage on a non-transitory computer-readable medium that, when executed by a processor, cause an apparatus to:
  determine a transmission parameter for a first group communication, wherein the apparatus is a management device of a group, and wherein the transmission parameter comprises a demodulation reference signal (DMRS) pattern that is for a second group communication of the group; and
  send information comprising the transmission parameter to a second device in the group through a broadcast message, wherein the broadcast message is a master information block-sidelink (MIB-SL) message transmitted on a physical sidelink broadcast channel (PSBCH) or a sidelink control information (SCI) message transmitted on a physical sidelink control channel (PSCCH); and perform one of:
    add a field indicating the DMRS pattern to the transmission parameter in the MIB-SL message when the broadcast message is a master information block-sidelink (MIB-SL) message transmitted on a physical sidelink broadcast channel (PSBCH); or
    send the information to the second device in the group on the resource through the SCI message when the broadcast message is a sidelink control information (SCI) message transmitted on a physical sidelink control channel (PSCCH).

15. The transmission parameter configuration method of claim 4, wherein the resource for the group communication is pre-configured locally on the first device.

16. The transmission parameter configuration method of claim 1 further comprising obtaining, at a physical layer of the first device from an application layer, an instruction for adjusting a transmission parameter, wherein the information is based on location information at the application layer.

17. The computer program product of claim 14, wherein the DMRS pattern comprises information indicating a quantity of DMRS symbols in a time scheduling unit, a location of a time-frequency resource, and a subcarrier spacing.

18. The computer program product of claim 14, wherein the transmission parameter comprises a frequency domain, and wherein the computer-executable instructions, when executed by the processor, further cause the apparatus to either:

monitor time-frequency domain resources in a resource pool to obtain a monitoring result, and determining, based on the monitoring result, the frequency domain resource for a third group communication in the time-frequency resources in the resource pool; or
    determine, based on a channel busy ratio (CBR) of a channel, the frequency domain resource for a fourth group communication in the channel.

* * * * *